Dec. 27, 1949   B. D. SMITH   2,492,329
HAND TIRE TOOL FOR MANIPULATING CASINGS
Filed Dec. 26, 1945
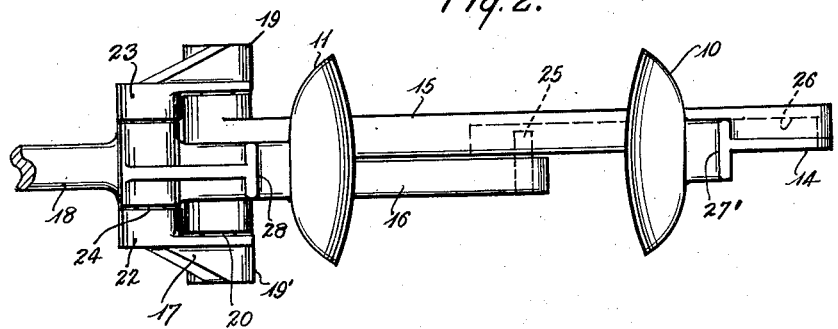
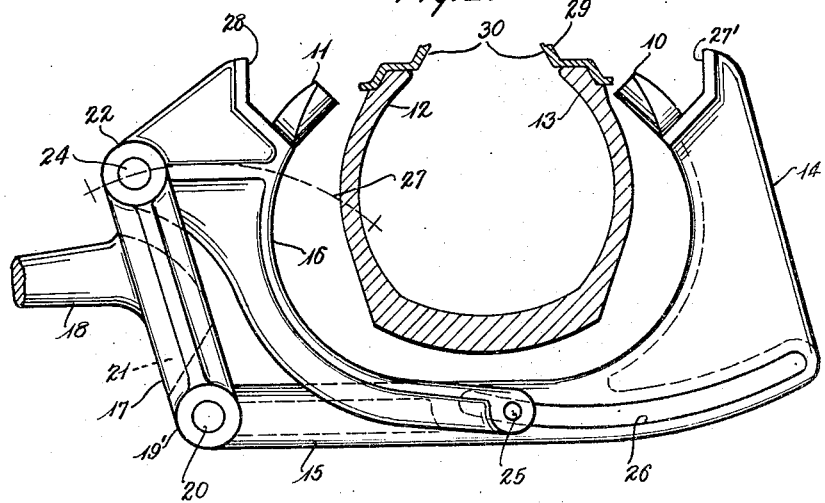
INVENTOR.
Blanchard D. Smith
BY Jewett and Mead
ATTORNEYS Patented Dec. 27, 1949

2,492,329

UNITED STATES PATENT OFFICE 2,492,329

HAND TIRE TOOL FOR MANIPULATING CASINGS

Blanchard D. Smith, Atlanta, Ga.

Application December 26, 1945, Serial No. 637,198

1 Claim. (Cl. 157—1.28)

The invention relates to tire tools and has as an object the provision of a tool for loosening tire casings from rims.

It is an object of the invention to provide a tool which may be used to break loose the casings of tires from the rim in preparation for removal of the casing without removing the rim from the vehicle.

It is a further object of the invention to provide a tool of the character referred to having ample leverage and providing for substantially straight line approach of the casing engaging members toward each other in the act of loosening the casing.

Further objects will appear from the following description when read in connection with the accompanying drawings showing an illustrative embodiment of the invention, and wherein—

Figure 1 is a side elevation of the tool showing a casing to be loosened from a rim in section and showing a handle broken away.

Fig. 2 is a plan view of the structure of Figure 1 omitting the showing of the tire.

In removing the casings from rims particularly in the case of truck tires, it is sometimes difficult to loosen the casing from the rim to which it becomes stuck as a result of the heat of service. At the present time, this is usually done by apparatus requiring the removal of the casing and rim from the vehicle after which the tire is laid down flat for application of removing apparatus.

The present invention provides a tool for use without such removal of the rim from the vehicle.

As shown, the device comprises a pair of jaws 10, 11 with provision for causing them to move in substantially straight line paths toward the side walls 12, 13 of the casing. To this end the jaw 10 is shown as carried by a member 14 having an arm 15 extending to the left, in Fig. 1, and the jaw 11 is carried by a member 16, extending to the right in Fig. 1.

The members 15 and 16 are shown as pivotally attached to a lever 17 rigidly connected to the end of a handle 18 which may be of sufficient length to provide the required leverage. The member 17 as shown, comprises hubs 19 and 19' perforated for the pivoting of the extension 15 thereto by means of pin 20 and the two parts of the lever 17 are shown as rigidly connected by means of the head 21 of the handle 18. The lever 17 is also formed with hub members 22, 23 to which the member 16 is pivoted by means of pin 24.

To induce substantially straight line movement of the two jaws 10 and 11 relative to each other the extension 16 is shown as carrying a pin 25 traveling in an arcuate slot 26 in member 14. The curve of the arcuate slot 16 is so related to the path of travel of the axis of the pin 24, which path is indicated by dot and dash lines 27, that such substantially straight line travel is achieved.

The device is intended to rest upon the ground under the casing as shown in Figure 1, when in use and for this reason the hubs 19 and 19' are shown as sufficiently separated that they may provide a three point support for the apparatus upon the ground, the third point being a point on the lower surface of the extension 15.

In the use of the device, the wheel to be operated on is jacked up just sufficiently to introduce the tool under the tread, as for instance to the position shown in Figure 1. As the tool is placed in the position shown, the handle 18 is actuated to cause the jaws 10 and 11 to move toward each other. To stop the movement of the jaws inwardly in case one side of the tire casing breaks loose before the other, the members 14 and 16 are shown as formed with stop means 27', 28 so extended as to impinge upon the rim itself at an appropriate point in the movement of the jaws. The result will be that the beads of the tire casing will be brought substantially into contact at a position central of the rim 29 and therefore when the casing is entirely loosened and the beads are brought to this point the combined beads may enter the channel 30 of the rim to enable the movement toward the axis of the rim required for slipping a diametrically opposed point of the casing over the rim in the usual manipulation of casing removal.

As shown the jaws 10 and 11 are upwardly concave upon an arc roughly following the arc of the rim and also are curved in plan view, convex toward the tire, whereby the initial contacts with the casing are at points occurring at the centers of the jaws. The latter curve will provide a gradual breaking loose of the casing thus reducing the required force to be applied.

Minor changes may be made in the physical embodiment of the invention within the scope of the appended claim without departing from the spirit of the invention.

I claim:

A tire tool comprising, in combination: an angular jaw carrying structure formed with a substantially horizontal portion of greater length than the axial diameter of a casing to be removed, and having an upstanding portion; a casing contacting jaw on said upstanding portion at substantially the elevation of the bead of a rim borne casing on a jacked up wheel; a second jaw structure comprising a substantially horizontal portion and an upstanding portion; a jaw carried by the latter portion substantially opposite the first named jaw; said first named structure formed in its horizontal portion with an arcuate slot curving upwardly toward its ends; a pin carried by the horizontal portion of the second named structure and entering said slot; a leverage member formed at its lower end with spaced hubs pivoted to the first named horizontal portion, and pivotally joined at a higher portion to said second named jaw structure; and force applying means carried by said leverage member between its ends to move the pivots thereof in opposite directions; the spacing of said hubs with a point on said first named horizontal portion providing a three point support for the device in use.

BLANCHARD D. SMITH.

REFERENCES CITED

The following references are of record in the file of this patent:

UNITED STATES PATENTS

| Number | Name | Date |
|---|---|---|
| 1,093,825 | Bryant | Apr. 21, 1914 |
| 1,869,244 | Gabler | July 26, 1932 |
| 2,199,162 | Oliva | Apr. 30, 1940 |
| 2,280,380 | Davenport | Apr. 21, 1942 |
| 2,333,880 | Ohlsen | Nov. 9, 1943 |
| 2,439,135 | Johnson et al. | Apr. 6, 1948 |